(12) United States Patent
Shimomura et al.

(10) Patent No.: US 12,395,099 B2
(45) Date of Patent: Aug. 19, 2025

(54) ENERGY HARVESTING ELEMENT AND ENERGY HARVESTING DEVICE

(71) Applicant: SAGINOMIYA SEISAKUSHO, INC., Tokyo (JP)

(72) Inventors: Noriko Shimomura, Sayama (JP); Hisayuki Ashizawa, Sayama (JP)

(73) Assignee: SAGINOMIYA SEISAKUSHO, INC., Tokyo (JP)

( * ) Notice: Subject to any disclaimer, the term of this patent is extended or adjusted under 35 U.S.C. 154(b) by 21 days.

(21) Appl. No.: 18/267,019

(22) PCT Filed: Oct. 7, 2021

(86) PCT No.: PCT/JP2021/037191
§ 371 (c)(1),
(2) Date: Jun. 13, 2023

(87) PCT Pub. No.: WO2022/130744
PCT Pub. Date: Jun. 23, 2022

(65) Prior Publication Data
US 2024/0305221 A1    Sep. 12, 2024

(30) Foreign Application Priority Data

Dec. 17, 2020 (JP) ................. 2020-209682

(51) Int. Cl.
*H02N 1/06* (2006.01)
*H02N 1/00* (2006.01)
(52) U.S. Cl.
CPC ..................... *H02N 1/06* (2013.01)

(58) Field of Classification Search
CPC ................. H02N 1/06; H02M 3/335
(Continued)

(56) References Cited

U.S. PATENT DOCUMENTS 6,833,687 B2 * 12/2004 Landolt .................. H02N 1/00
    320/166
9,190,936 B2 * 11/2015 Naito ....................... H02N 1/00
(Continued)

FOREIGN PATENT DOCUMENTS

JP    2012044823 A    3/2012
JP    2017135775 A    8/2017
(Continued)

OTHER PUBLICATIONS

International Preliminary Report on Patentability, PCT/JP2021/037191, Jun. 29, 2023.

*Primary Examiner* — Burton S Mullins
(74) *Attorney, Agent, or Firm* — The Webb Law Firm (57) ABSTRACT

An energy harvesting element capable of efficiently generating power is provided. The energy harvesting element generates power by vibration, and includes a first electrode and a second electrode, a member having a third electrode electrically connected to the second electrode, and facing the first electrode, and a fourth electrode relatively fixed to the third electrode without being electrically connected to the third electrode, and electrically connected to the first electrode and facing the second electrode, the member being provided between the first electrode and the second electrode, and an electret provided in one of the first electrode and the third electrode, and one of the second electrode and the fourth electrode.

9 Claims, 6 Drawing Sheets

(58) Field of Classification Search
USPC .......................................................... 310/309
See application file for complete search history.

(56) References Cited

U.S. PATENT DOCUMENTS

| | | | | |
|---|---|---|---|---|
| 2010/0072855 | A1* | 3/2010 | Matsubara | H02N 1/08 |
| | | | | 310/300 |
| 2012/0043851 | A1 | 2/2012 | Sano | |
| 2014/0055002 | A1* | 2/2014 | Nakatsuka | H02N 1/08 |
| | | | | 310/308 |
| 2014/0346923 | A1* | 11/2014 | Hayashi | H02M 5/32 |
| | | | | 310/309 |
| 2017/0214338 | A1 | 7/2017 | Otagiri et al. | |
| 2021/0234479 | A1* | 7/2021 | Toshiyoshi | B81B 3/00 |

FOREIGN PATENT DOCUMENTS

| | | |
|---|---|---|
| JP | 2019198161 A | 11/2019 |
| WO | 2013057897 A1 | 4/2013 |

* cited by examiner

FIG.5

ENERGY HARVESTING ELEMENT AND ENERGY HARVESTING DEVICE

CROSS-REFERENCE TO RELATED APPLICATIONS

This application is the United States national phase of International Application No. PCT/JP2021/037191 filed Oct. 7, 2021, and claims priority to Japanese Patent Application No. 2020-209682 filed Dec. 17, 2020, the disclosures of which are hereby incorporated by reference in their entireties.

BACKGROUND OF THE INVENTION

Field of the Invention

The present invention relates to an energy harvesting element and an energy harvesting device.

Description of Related Art

A vibration-driven energy harvesting element is known that includes two fixed electrodes and two movable electrodes, each having a comb-teeth portion (Patent Literature 1).

CITATION LIST

Patent Literature

Patent Literature 1: Japanese Patent Laid-Open No. 2019-198161

SUMMARY OF INVENTION

Technical Problem

In the vibration-driven energy harvesting element described in Patent Literature 1, power generation is performed in such a way that a change of the area of a portion where the fixed electrode and the movable electrodes face each other causes change of the charge induced by an electret, which changes potential difference between the fixed electrodes and the movable electrodes to generate an electromotive force. Conventionally, it has been desired to efficiently generate power.

Solution to Problem

According to a first aspect of the present invention, an energy harvesting element generates power by vibration, and includes a first electrode and a second electrode, a member having a third electrode electrically connected to the second electrode, and facing the first electrode, and a fourth electrode relatively fixed to the third electrode without being electrically connected to the third electrode, and electrically connected to the first electrode and facing the second electrode, the member being provided between the first electrode and the second electrode, and an electret provided in one of the first electrode and the third electrode, and one of the second electrode and the fourth electrode.

According to a second aspect of the present invention, an energy harvesting device includes the energy harvesting element according to the first aspect, and a rectifier having an electrode electrically connected to the first electrode and the fourth electrode, and an electrode electrically connected to the second electrode and the third electrode.

According to a third aspect of the present invention, an energy harvesting element generates power by vibration, and includes a first electrode and a second electrode electrically connected to the first electrode, a member having a third electrode facing the first electrode, and a fourth electrode relatively fixed to the third electrode, and electrically connected to the third electrode and facing the second electrode, the member being provided between the first electrode and the second electrode, and an electret provided in one of the first electrode and the third electrode, and one of the second electrode and the fourth electrode.

According to a fourth aspect of the present invention, an energy harvesting device includes the energy harvesting element according to the third aspect, and a rectifier having an electrode electrically connected to the first electrode and the second electrode, and an electrode electrically connected to the third electrode and the fourth electrode.

Advantageous Effect of Invention

According to the present invention, power can be efficiently generated.

DESCRIPTION OF THE INVENTION

Embodiment

Figure 1:
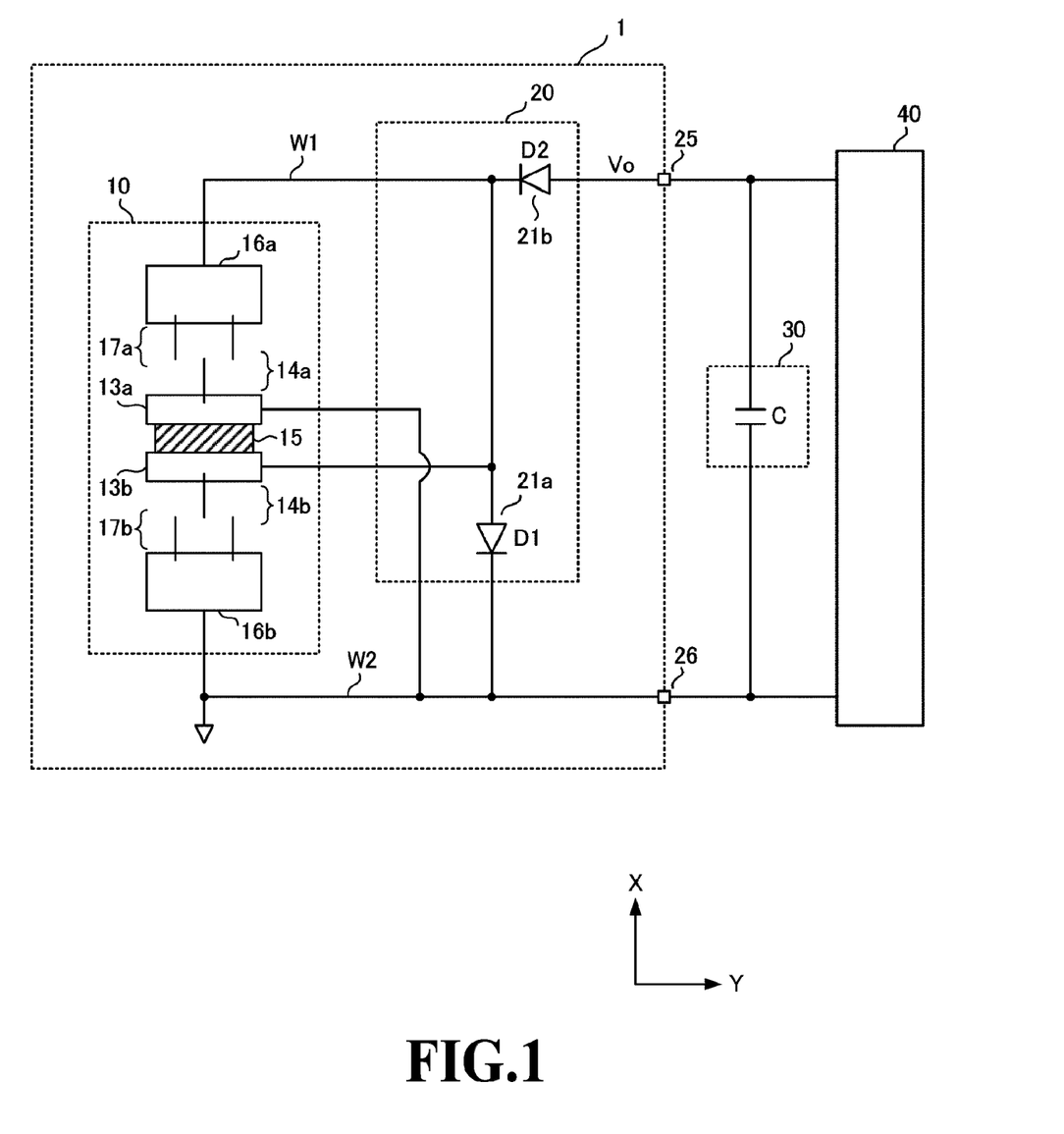
FIG. 1 is a diagram illustrating a configuration example of an energy harvesting device according to an embodiment.

With reference to the drawings, an energy harvesting device according to an embodiment will be described. FIG. 1 is a diagram illustrating a configuration example of the energy harvesting device according to the embodiment. An energy harvesting device (vibration-driven energy harvesting device) 1 includes an energy harvesting element 10, a converter 20, a first output part 25, and a second output part 26, and generates power by utilizing vibration. The energy harvesting device 1 is an electrostatic energy harvesting device, and can be utilized as the technology of harvesting the energy of vibration in an environment to obtain power (energy harvesting).

Figure 2:
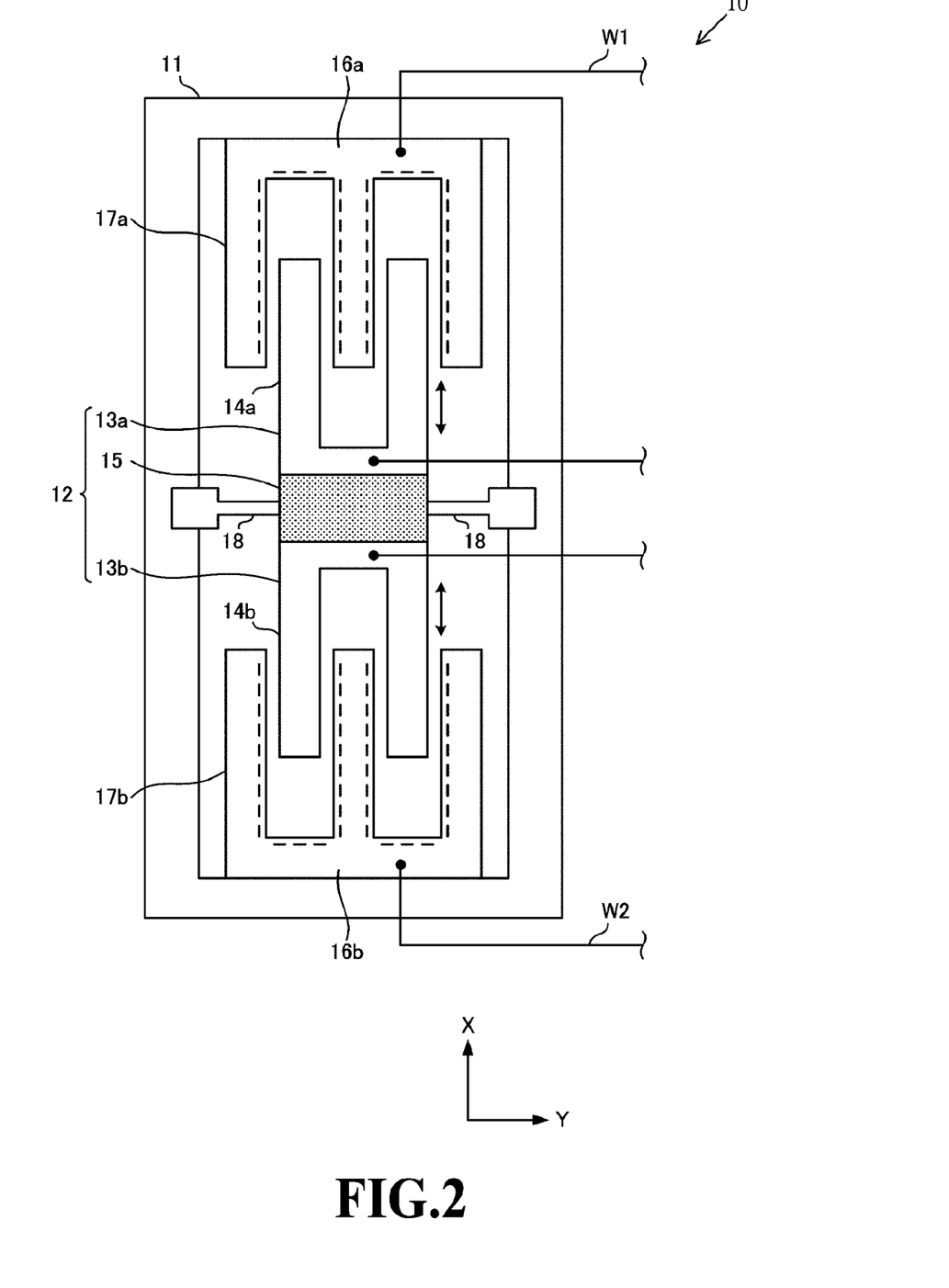
FIG. 2 is a diagram illustrating a configuration example of an energy harvesting element according to the embodiment.

FIG. 2 is a diagram illustrating a configuration example of an energy harvesting element according to the embodiment. The energy harvesting element (vibration-driven energy harvesting element) 10 includes a support frame (support member) 11, a movable part 12, and a holding part 18. The vibration-driven energy harvesting element 10 uses, for example, a silicon substrate or an SOI (Silicon On Insulator) substrate as a base material, and is manufactured by utilizing the MEMS technology.

The support frame (base) 11 includes an electrode 16a and an electrode 16b. It can be said that the electrode 16a and the electrode 16b are electrodes fixed to and held by the support frame 11. The electrode 16a and the electrode 16b are arranged in an up-and-down direction (X-axis direction) of the paper with the movable unit 12 being therebetween. In the following description, the fixed electrode 16a and electrode 16b will be referred to as the first fixed electrode 16a and the second fixed electrode 16b, respectively. Note that, as illustrated by coordinate axes in FIG. 1 and FIG. 2, it is assumed that the right direction of the paper, which is orthogonal to an X axis, is a Y-axis plus direction. In the other diagrams, a coordinate axis may be displayed so that the orientation of each diagram can be recognized on the basis of the coordinate axes in FIG. 1 and FIG. 2.

The movable part 12 includes an electrode 13a, an electrode 13b, and an insulating part 15. The electrode 13a and the electrode 13b are fixed to each other via the insulating part 15. The electrode 13a and the electrode 13b are supported by the insulating part 15 to be in a relatively fixed state. The insulating part 15 is an insulating layer formed by an insulating material. The electrode 13a and the electrode 13b are provided such that they are separated by the insulating part 15, and can also be called the separated electrodes.

The movable part 12 is configured such that the electrode 13a, the electrode 13b, and the insulating part 15 are movable in the X-axis direction within the support frame 11. The electrode 13a, the electrode 13b, and the insulating part 15 are vibrated in unison, when vibration is added to the vibration-driven energy harvesting element 10. In the following description, the electrode 13a and the electrode 13b will be referred to as the first movable electrode 13a and the second movable electrode 13b, respectively. The first movable electrode 13a and the first fixed electrode 16a are arranged to face each other, and can move relative to each other. Additionally, the second movable electrode 13b and the second fixed electrode 16b are also arranged to face each other, and can move relative to each other.

The first fixed electrode 16a, the second fixed electrode 16b, the first movable electrode 13a, and the second movable electrode 13b each includes a portion forming a comb-teeth shape (comb-teeth portion), and serves as a comb-teeth-like electrode. A comb-teeth portion 17a of the first fixed electrode 16a and the comb-teeth portion 14a of the first movable electrode 13a are formed to be engaged with each other. Additionally, a comb-teeth portion 17b of the second fixed electrode 16b and a comb-teeth portion 14b of the second movable electrode 13b are also formed to be engaged with each other. Note that the number and arrangement of comb teeth that are provided in the first fixed electrode 16a, the second fixed electrode 16b, the first movable electrode 13a, and the second movable electrode 13b are not limited to the example illustrated.

An electret is formed in the vicinity of surfaces of the first fixed electrode 16a that face the first movable electrode 13a. An electret is also formed in the vicinity of surfaces of the second fixed electrode 16b that face the second movable electrode 13b. The electret having a fixed charge is provided in the comb-teeth portion 17a of the first fixed electrode 16a, and the comb-teeth portion 17b of the second fixed electrode 16b. For example, an oxide film having a negative fixed charge is formed as an electret film (layer) in each of the comb-teeth portion 17a and the comb-teeth portion 17b.

Each of the first fixed electrode 16a and the second fixed electrode 16b serves as an electretized electrode, and is semi-permanently charged. Note that, as schematically indicated by the symbols "-" in the figure, each of the first fixed electrode 16a and the second fixed electrode 16b will generally be in a negatively charged state.

A capacity (electrostatic capacitance) is formed between the first fixed electrode 16a and the first movable electrode 13a. Additionally, an electrostatic capacitance is also formed between the second fixed electrode 16b and the second movable electrode 13b. Note that an electret having positive charge may be provided in the first fixed electrode 16a and the second fixed electrode 16b. Additionally, an electret having positive charge or negative charge may be provided in the first movable electrode 13a and the second movable electrode 13b.

The holding part 18 is configured to have elasticity, and holds (supports) the movable part 12. The holding part 18 is formed to have flexibility by using, for example, the same material (for example, silicon) as the first fixed electrode 16a, the second fixed electrode 16b, the first movable electrode 13a, and the second movable electrode 13b. The movable part 12 is in a state where the movable part 12 is elastically supported by the holding part 18, and can move (vibrate) in the X-axis direction. Note that the holding part 18 may be formed by using a metal material, or may be formed by using other materials having flexibility.

The vibration-driven energy harvesting element 10 can be connected to a component (circuit) that operates with power supplied from the vibration-driven energy harvesting element 10. A converter that converts alternating current generated by the vibration-driven energy harvesting element 10 into direct current, a power storage part (capacitor, battery, or the like), a transformer (step-down circuit, step-up circuit, or the like) that transforms a voltage, and the like can be connected to the vibration-driven energy harvesting element 10. In the example illustrated in FIG. 1, the vibration-driven energy harvesting element 10 is electrically connected to the converter 20, the power storage part 30, and the transformer 40.

When vibration is given to the vibration-driven energy harvesting element 10 from the outside, deflection (elastic deformation) occurs in the holding part 18, the movable part 12 is vibrated in the X-axis direction, and displacement of the first movable electrode 13a and the second movable electrode 13b occurs. When the first movable electrode 13a and the second movable electrode 13b are vibrated with respect to the first fixed electrode 16a and the second fixed electrode 16b, the positional relationship between the first movable electrode 13a and the first fixed electrode 16a is changed, and the positional relationship between the second movable electrode 13b and the second fixed electrode 16b is also changed. With the movement of the movable part 12 in the X direction, the comb-teeth portion 14a of the first movable electrode 13a moves away from and close to the comb-teeth portion 17a of the first fixed electrode 16a in the X direction. Additionally, the comb-teeth portion 14b of the second movable electrode 13b moves away from and close to the comb-teeth portion 17b of the second fixed electrode 16b in the X direction.

When the position of the first movable electrode 13a is changed, the interval (distance) between the first movable electrode 13a and the first fixed electrode 16a is changed, and the area of a region in the comb-teeth portion 14a of the first movable electrode 13a that faces the comb-teeth portion 17a of the first fixed electrode 16a is changed. According to the change in this area, (the size of) the electrostatic capacitance by the first movable electrode 13*a* and the first fixed electrode 16*a* is changed, and the charge amount induced in the first movable electrode 13*a* by the electret of the first fixed electrode 16*a* is changed. In this case, charge transfer occurs between the first fixed electrode 16*a* and an external circuit electrically connected to the first fixed electrode 16*a*. The charge transfer occurs in a connecting part (wire, terminal, or the like) W1 illustrated in FIG. 1 and FIG. 2, and a current is generated between the first fixed electrode 16*a* and the external circuit.

Additionally, when the position of the second movable electrode 13*b* is changed, the interval between the second movable electrode 13*b* and the second fixed electrode 16*b* is changed, and the area of a region in the comb-teeth portion 14*b* of the second movable electrode 13*b* that faces the comb-teeth portion 17*b* of the second fixed electrode 16*b* is changed. According to the change in this area, the electrostatic capacitance by the second movable electrode 13*b* and the second fixed electrode 16*b* is changed, and the charge amount induced in the second movable electrode 13*b* by the electret of the second fixed electrode 16*b* is changed. In this case, charge transfer occurs between the second fixed electrode 16*b* and the external circuits electrically connected to the second fixed electrode 16*b*. The charge transfer occurs in a connecting portions (wire, terminal, or the like) W2 illustrated in FIG. 1 and FIG. 2, and a current is generated between the second fixed electrode 16*b* and the external circuit.

The electrostatic capacitance between the first movable electrode 13*a* and the first fixed electrode 16*a* and the electrostatic capacitance between the second movable electrode 13*b* and the second fixed electrode 16*b* are changed in opposite phases. When the electrostatic capacitance between the first movable electrode 13*a* and the first fixed electrode 16*a* is varied, alternating current flows between the first fixed electrode 16*a* and the external circuit, and power is generated. Additionally, when the electrostatic capacitance between the second movable electrode 13*b* and the second fixed electrode 16*b* is varied, an alternating current flows between the second fixed electrode 16*b* and the external circuit, and power is generated.

In this manner, in the energy harvesting device 1 according to the present embodiment, alternating current power can be generated by utilizing the change in the electrostatic capacitance that is caused due to vibration. Since the vibration-driven energy harvesting element 10 generates power between the first movable electrode 13*a* and the first fixed electrode 16*a*, and between the second movable electrode 13*b* and the second fixed electrode 16*b*, the amount of power generated can be increased. It becomes possible to efficiently convert vibrational energy into electric energy, and power generation efficiency can be improved.

The converter 20 illustrated in FIG. 1 is configured to include two rectifiers (rectifier elements) 21, and includes a function of converting alternating current into direct current. The converter 20 is a rectifier circuit that converts alternating current into direct current. Each of the two rectifiers 21 (a first rectifier 21*a*, a second rectifier 21*b*) is composed of a diode. The converter 20 is provided between the first output part 25 and the second output part 26, and is electrically connected to the vibration-driven energy harvesting element 10. The converter 20 converts alternating current (voltage) from the vibration-driven energy harvesting element 10 into direct current. Note that the rectifier 21 may be composed by using a MOS transistor, or may be composed by using a bipolar transistor.

The first output part 25 and the second output part 26 are parts (wires, terminals, or the like) to which the voltage (current) obtained by power generation by the vibration-driven energy harvesting element 10 is output. Power is supplied to the outside (the power storage part 30 and the transformer 40 in FIG. 1) of the energy harvesting device 1 via the first output part 25 and the 2nd output part 26. Note that, as illustrated in FIG. 1, the second output part 26 and the wire W2 are connected to an earthing wire (ground wire). The potential of the second output part 26 and the wire W2 serves as a reference potential (earth potential) for the potential of each of the first output part 25 and the wire W1.

The power storage part 30 is provided between the first output part 25 and the second output part 26, and is supplied with power generated by the vibration-driven energy harvesting element 10. The power storage part 30 is charged with power generated by the vibration-driven energy harvesting element 10, and stores (accumulates) the power. In the example illustrated in FIG. 1, the power storage part 30 is configured to include a capacitor C. An end of the capacitor C is connected to the first output part 25, and the potential obtained by power generation is given to the end of the capacitor C. The other end of the capacitor C is connected to the second output part 26 and the wire W2, and the reference potential is given to the other end of the capacitor C. The power storage parts 30 is also a smoothing part that smoothen the voltage output by the vibration-driven energy harvesting element 10. Note that the energy harvesting device 1 may be configured to include the power storage part 30.

The transformer 40 transforms and outputs the voltage that is input via the first output part 25 and the second output part 26. The transformer (transforming circuit) 40 is a component used in combination with the vibration-driven energy harvesting element 10 during actual use, and operates as a load during actual use. The transformer 40 is, for example, a step-down circuit, and is composed of a DC-DC converter, or the like. The step-down circuit can output the voltage obtained by stepping down the voltage of the capacitor C. The component used as the transformer 40 is selected in consideration of the magnitude of the voltage and current that are output from the vibration-driven energy harvesting element 10, and the like. Note that the energy harvesting device 1 may be configured to include the transformer 40.

In the example illustrated in FIG. 1, the first rectifier 21*a* is composed by using a diode D1. An anode (terminal), which is one electrode of the diode D1, is electrically connected to the first fixed electrode 16*a* and the second movable electrode 13*b* of the vibration-driven energy harvesting element 10. The first fixed electrode 16*a* and the second movable electrode 13*b* are both electrically connected to the wire W1, and are electrically connected to each other. Additionally, the anode of the diode D1 is also electrically connected to the second rectifier 21*b*.

A cathode (terminal), which is the other electrode of the diode D1, is electrically connected to the second fixed electrode 16*b* and the first movable electrode 13*a* of the vibration-driven energy harvesting element 10. The second fixed electrode 16*b* and the first movable electrode 13*a* are both electrically connected to the wire W2, and are electrically connected to each other. Additionally, the cathode of the diode D1 is connected to the other end of the capacitor C and the transformer 40 via the second output part 26. The potential of the cathode of the diode D1 is the earth potential.

The second rectifier 21*b* is composed by using a diode D2. The cathode of the diode D2 is electrically connected to the first fixed electrode 16a and the second movable electrode 13b of the vibration-driven energy harvesting element 10. Additionally, the cathode of the diode D2 is electrically connected to the first rectifier 21a. The anode of the diode D2 is connected to the end of the capacitor C and the transformer 40 via the first output part 25.

In this manner, the energy harvesting device 1 according to the present embodiment includes the first movable electrode 13a and the second movable electrode 13b that are electrically separated from each other. The first fixed electrode 16a and the second movable electrode 13b are electrically connected to each other, and the second fixed electrode 16b and the first movable electrode 13a are electrically connected to each other. A first pair (group) of the first fixed electrode 16a and the first movable electrode 13a, and a second pair of the second fixed electrode 16b and the second movable electrode 13b are in a state where the first pair and the second pair are connected in parallel.

Figure 3A:
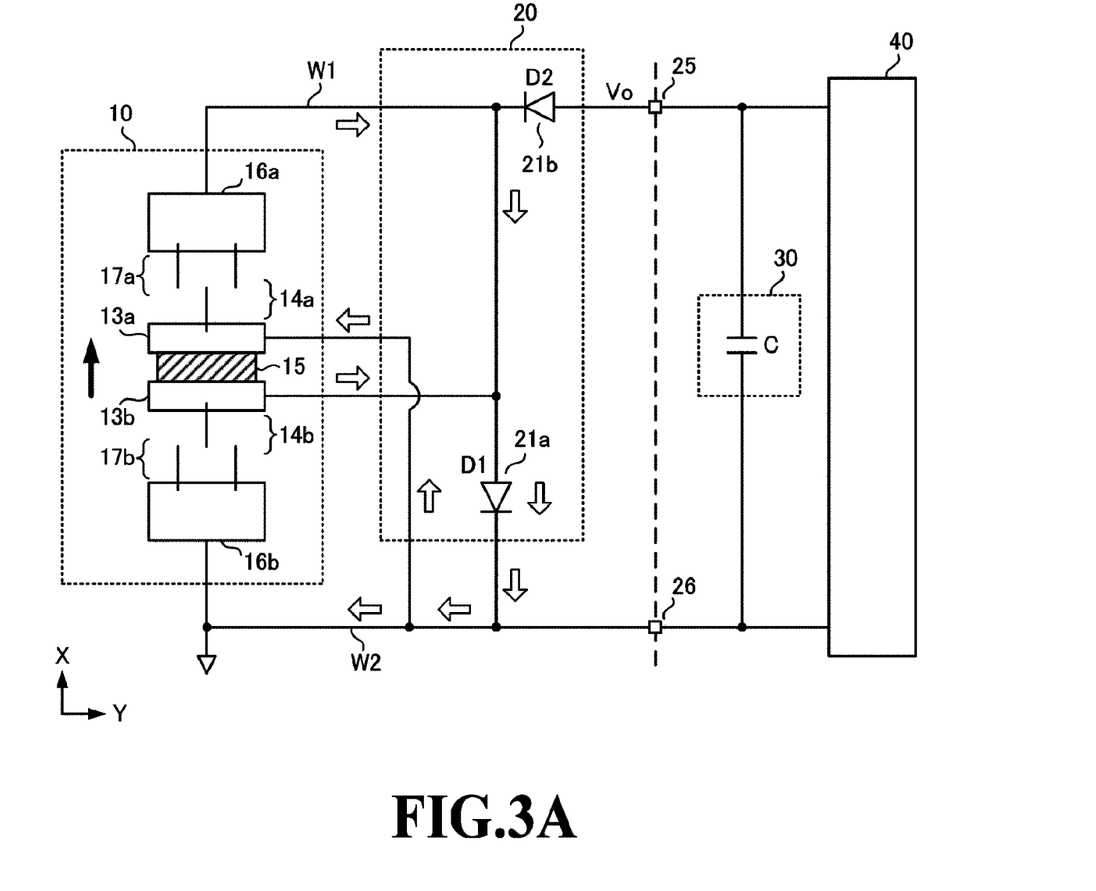
FIG. 3A is a diagram for describing an example of the operation of the energy harvesting device according to the embodiment.
Figure 3B:
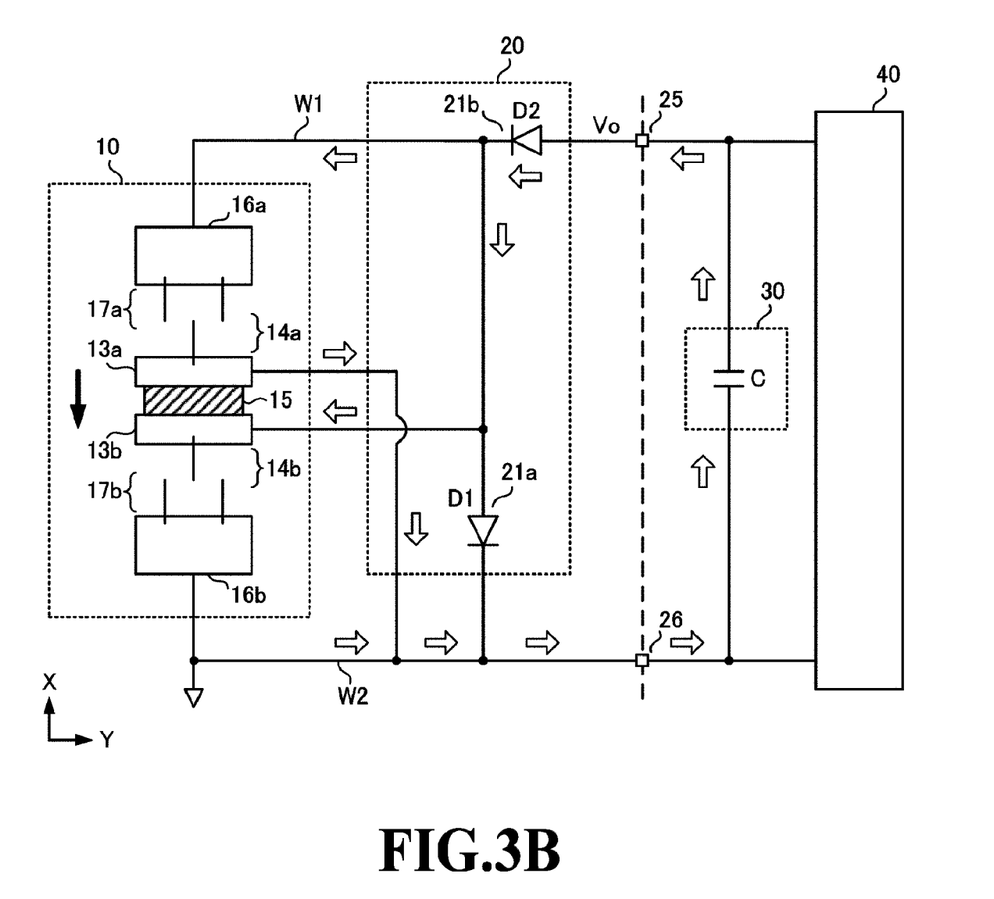
FIG. 3B is a diagram for describing an example of the operation of the energy harvesting device according to the embodiment.

FIG. 3A and FIG. 3B are a diagram for describing an example of the operation of the energy harvesting device according to the embodiment. FIG. 3A and FIG. 3B schematically illustrate the current generated in the energy harvesting device 1, when the movable part 12 is vibrated with respect to the first fixed electrode 16a and the second fixed electrode 16b in the X direction. FIG. 3A illustrates a case where the movable part 12 is moved in a +X direction, and FIG. 3B illustrates a case where the movable part 12 is moved in a −X direction.

In the state illustrated in FIG. 3A, with the movement of the movable part 12 in the +X direction, the area of the part where the comb-teeth portion 14a of the first movable electrode 13a and the comb-teeth portion 17a of the first fixed electrode 16a face each other is increased. Additionally, the area of the part where the comb-teeth portion 14b of the second movable electrode 13b and the comb-teeth portion 17b of the second fixed electrode 16b face each other is decreased. Therefore, the electrostatic capacitance between the first movable electrode 13a and the first fixed electrode 16a is increased, and the electrostatic capacitance between the second movable electrode 13b and the second fixed electrode 16b is decreased.

Since the electrostatic capacitance between the first movable electrode 13a and the first fixed electrode 16a is increased, the amount of positive charge induced in the first movable electrode 13a by the electret of the first fixed electrode 16a is increased. Additionally, since the electrostatic capacitance between the second movable electrode 13b and the second fixed electrode 16b is decreased, the amount of positive charge induced in the second movable electrode 13b by the electret of the second fixed electrode 16b is decreased. At this time, negative charge (electrons) tries to move from the second fixed electrode 16b and the first movable electrode 13a toward the first fixed electrode 16a and the second movable electrode 13b via the wire W1 and the wire W2, and the diode D1 of the first rectifier 21a is in an ON state (forward bias state). The diode D2 of the second rectifier 21b is in an OFF state (reverse bias state). When the first rectifier 21a is in the ON state, current flows as indicated by white arrows illustrated in FIG. 3A.

On the other hand, in the state illustrated in FIG. 3B, with the movement of the movable part 12 in the −X direction, the area of the part where the comb-teeth portion 14a of the first movable electrode 13a and the comb-teeth portion 17a of the first fixed electrode 16a face each other is decreased, and the area of the part where the comb-teeth portion 14b of the second movable electrode 13b and the comb-teeth portion 17b of the second fixed electrode 16b face each other is increased. Therefore, the electrostatic capacitance between the first movable electrode 13a and the first fixed electrode 16a is decreased, and the electrostatic capacitance between the second movable electrode 13b and the second fixed electrode 16b is increased.

Since the electrostatic capacitance between the first movable electrode 13a and the first fixed electrode 16a is decreased, the amount of positive charge induced in the first movable electrode 13a is decreased. Additionally, since the electrostatic capacitance between the second movable electrode 13b and the second fixed electrode 16b is increased, the amount of positive charge induced in the second movable electrode 13b is increased. At this time, negative charge tries to move from the first fixed electrode 16a and the second movable electrode 13b toward the side of the end of the capacitor C and the transformer 40, which are connected to the first output part 25, via the wire W1, and the second rectifier 21b is in the ON state. Additionally, the movement of negative charge occurs from the side of the other end of the capacitor C and the transformer 40, which are connected to the second output part 26, toward the second fixed electrode 16b and the first movable electrode 13a via the wire W2. The first rectifier 21a is in the OFF state.

In this case of FIG. 3B, current flows as indicated by white arrows in the figure. The current according to the change in the electrostatic capacitance between the first movable electrode 13a and the first fixed electrode 16a, and the current according to change in the electrostatic capacitance between the second movable electrode 13b and the second fixed electrode 16b flow between the first output part 25 and the second output part 26. The current obtained by combining the current obtained by power generation by the first pair of the first fixed electrode 16a and the first movable electrode 13a, and the current obtained by power generation by the second pair of the second fixed electrode 16b and the second movable electrode 13b will be output.

In this manner, the energy harvesting device 1 according to the present embodiment outputs the current and voltage obtained by power generation by the two electrode pairs that are connected in parallel. Therefore, in the present embodiment, compared with a case where the first movable electrode 13a and the second movable electrode 13b are not electrically separated, it becomes possible to supply current of substantially twice the magnitude to the transformer 40. Additionally, compared with a case where the first pair and the second pair are connected in series, it becomes possible to supply the voltage of substantially half the magnitude to the transformer 40.

When the voltage that is output from the vibration-driven energy harvesting element 10 is excessively high, a high voltage component is required as the subsequent transformer 40, making the selection of components difficult. Additionally, there is a possibility that components become expensive, and the manufacturing cost of the energy harvesting device 1 is increased. On the other hand, in the present embodiment, it is possible to reduce the voltage that is output from the vibration-driven energy harvesting element 10, and to reduce the voltage that is input to a subsequent circuit as described above. Therefore, it becomes possible to avoid that the selection of components to be used in the subsequent circuit becomes difficult. Additionally, it is possible to prevent an increase in the manufacturing cost of the energy harvesting device 1.

Figure 4:
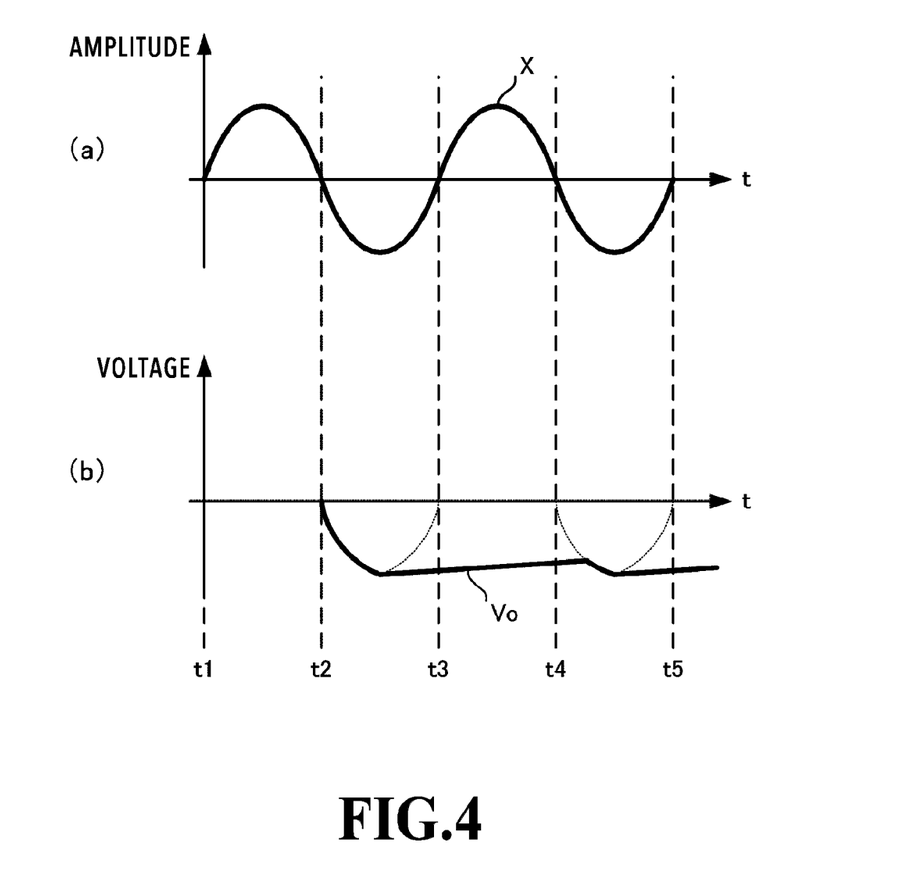
FIG. 4 is a diagram for describing processing performed by the energy harvesting device according to the embodiment.

FIG. 4 is a diagram for describing processing performed by the energy harvesting device according to the embodiment. FIG. 4 illustrates an amplitude x of the movable part 12 (FIG. 4(a)), and a voltage Vo of the first output part 25

(FIG. 4(b)) on the same time axis. In FIG. 4(a), a vertical axis represents the amplitude (amount of movement) of the movable part 12 in the X-axis direction. In FIG. 4(b), the vertical axis represents the magnitude of voltage. The voltage Vo is the voltage applied to the end of the capacitor C and the transformer 40 via the first output part 25.

As described above by using FIG. 3A and FIG. 3B, in the energy harvesting device 1, alternating current is generated that changes the direction of current between a case where the amplitude x of the movable part 12 has a positive value, that is, a case where the movable part 12 is moved in the +X direction, and a case where the amplitude x of the movable part 12 has a negative value, that is, the movable part 12 is moved in the −X direction. When the movable part 12 is moved in the +X direction, the diode D1 is in the ON state, and the diode D2 is in the OFF state. When the movable part 12 is moved in the −X direction, the diode D1 is in the OFF state, and the diode D2 is in the ON state.

In a period from a time t1 to a time t2 illustrated in FIG. 4(a) and FIG. 4(b), with the movement of the movable part 12 in the +X direction, the diode D1 is in the ON state, and the diode D2 is in the OFF state. In this case, current flows from the first fixed electrode 16a and second movable electrode 13b side to the second fixed electrode 16b and first movable electrode 13a side via the diode D1.

In a period from the time t2 to a time t3, with the movement of the movable part 12 in the −X direction, the diode D2 is in the ON state, and the diode D1 is in the OFF state. In this case, current flows from the second fixed electrode 16b and first movable electrode 13a side to the first fixed electrode 16a and second movable electrode 13b side via the diode D2, the first output part 25, and the second output part 26. The current obtained by combining the current obtained by power generation by the first movable electrode 13a and the first fixed electrode 16a, and the current obtained by power generation by the second movable electrode 13b and the second fixed electrode 16b is output to the power storage part 30 and the transformer 40. Accordingly, the capacitor C is charged, and the value (level) of the voltage Vo is increased as indicated by a bold line in FIG. 4(b). Note that, in the example illustrated in FIG. 4, the voltage Vo has a negative value.

In a period from the time t3 to a time t4, similar to the case of the period from the time t1 to the time t2, current flows in the energy harvesting device 1 according to the movement of the movable part 12 in the +X direction. In this case, the diode D2 is in the OFF state as described above. Therefore, the charge accumulated in the capacitor C is retained, and deterioration of the voltage Vo can be suppressed.

In a period from the time t4 to a time t5, similar to the case of the period from the time t2 to the time t3, current flows in the energy harvesting device 1 according to the movement of the movable part 12 in the −X direction. In this case, the capacitor C is charged, and the value of the voltage Vo is increased. The voltage Vo of the capacitor C charged by power generation by the vibration-driven energy harvesting element 10 is supplied to the transformer 40.

In this manner, the energy harvesting device 1 according to the present embodiment generates power by the first pair of the first fixed electrode 16a and the first movable electrode 13a, and the second pair of the second fixed electrode 16b and the second movable electrode 13b. Therefore, the energy harvesting device 1 can efficiently generate power. Additionally, since power is generated by the two electrode pairs that are electrically connected in parallel, it is possible to reduce the voltage supplied to the outside of the energy harvesting device 1, and to increase the current supplied to the outside of the energy harvesting device 1. The ratio between the voltage and the current that are output from the vibration-driven energy harvesting element 10, that is, impedance (output impedance) can be reduced. Therefore, it becomes possible to avoid that the selection of a component to be used as the transformer 40 becomes difficult.

Additionally, in the energy harvesting device 1 according to the present embodiment, rectification is performed by the two diodes D1 and D2. Therefore, compared with a case where rectification is performed by using a large number of diodes, the loss of power in the diodes can be suppressed, and the power generation efficiency can be improved. Additionally, it is possible to prevent an increase in the manufacturing cost of the energy harvesting device 1.

Note that, although the configuration example of the converter 20 has been described in the above, the configuration example is merely an example, and the configuration of the converter (rectifier circuit) 20 is not limited to the above-described example. The configuration of the converter 20 can be appropriately changed, and may be configured to include, for example, three or more diodes. A rectifier circuit in which four diodes are arranged in a bridge configuration may be used as the converter 20.

According to the above-described embodiment, the following effects can be obtained. (1) An energy harvesting element (vibration-driven energy harvesting element 10) generates power by vibration, and includes a first electrode (first fixed electrode 16a) and a second electrode (second fixed electrode 16b), a member (movable part 12) having a third electrode (first movable electrode 13a) electrically connected to the second electrode, and facing the first electrode, and a fourth electrode (second movable electrode 13b) relatively fixed to the third electrode without being electrically connected to the third electrode, and electrically connected to the first electrode and facing the second electrode, the member being provided between the first electrode and the second electrode, and an electret provided in one of the first electrode and the third electrode, and one of the second electrode and the fourth electrode. Since being configured as described above, the vibration-driven energy harvesting element 10 according to the present embodiment can efficiently generate power. Additionally, since power is generated by the two electrode pairs that are connected in parallel, the output impedance can be reduced. Accordingly, it is possible to avoid that the selection of components to be connected to the vibration-driven energy harvesting element 10 becomes difficult.

(2) The energy harvesting device 1 includes the energy harvesting element (vibration-driven energy harvesting element 10), and the converter 20 that converts alternating current generated by the energy harvesting element to direct current. The converter 20 includes the first rectifier 21a having the electrode (anode) electrically connected to the first electrode and the fourth electrode, and the electrode (cathode) electrically connected to the second electrode and the third electrode, and the second rectifier 21b having the electrode (cathode) electrically connected to the first electrode and the fourth electrode, and the electrode (anode) electrically connected to the output part (first output part 25). Since the energy harvesting device 1 according to the present embodiment performs rectification by the two diodes, compared with a case where rectification is performed by a large number of diodes, the loss of power in the energy harvesting device 1 can be suppressed, and the power generation efficiency can be improved. Additionally, it is possible to prevent an increase in the manufacturing cost of the energy harvesting device 1.

With reference to the drawings, a modification will be described below. Note that, in the figures, the same reference numbers are given to the parts that are identical or corresponding to the parts in the above-described embodiment, and the differences from the above-described embodiment will be mainly described.

Figure 5:
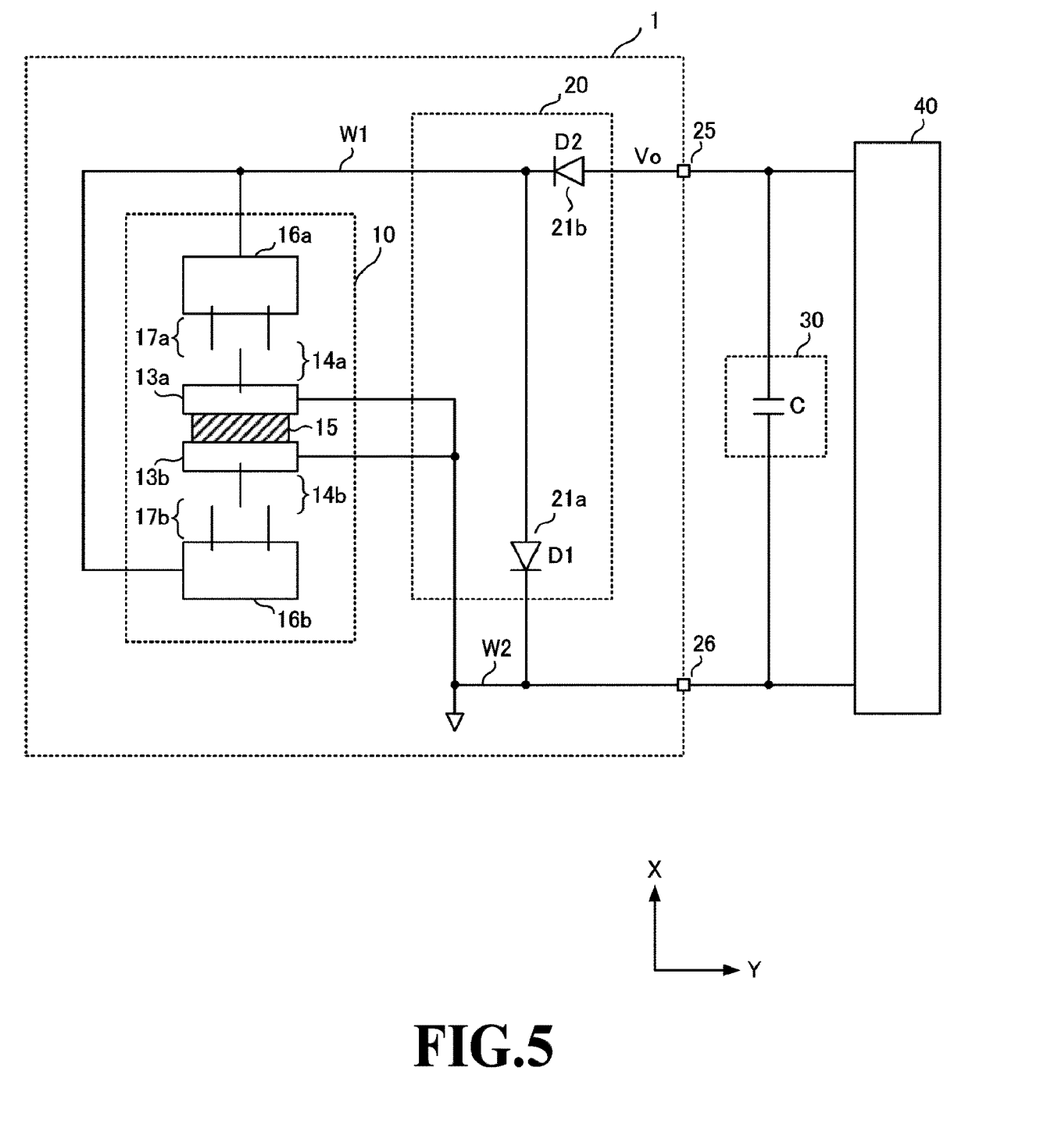
FIG. 5 is a diagram illustrating a configuration example of an energy harvesting device according to a modification.

FIG. 5 is a diagram illustrating a configuration example of an energy harvesting device according to a modification. In the example illustrated in FIG. 5, the anode of the diode D1 of the converter 20 is electrically connected to the first fixed electrode 16a and the second fixed electrode 16b of the vibration-driven energy harvesting element 10. The first fixed electrode 16a and the second fixed electrode 16b are both electrically connected to the wire W1, and are electrically connected to each other. The cathode of the diode D1 is electrically connected to the first movable electrode 13a and the second movable electrode 13b of the vibration-driven energy harvesting element 10. The first movable electrode 13a and the second movable electrode 13b are both electrically connected to the wire W2, and are electrically connected to each other. The cathode of the diode D2 of the converter 20 is electrically connected to the first fixed electrode 16a, the second fixed electrode 16b, and the anode of the diode D1.

Additionally, in the present modification, each of the first fixed electrode 16a and the second movable electrode 13b is provided with an electret having negative charge, and serves as an electretized electrode. Note that an electret having positive charge may be provided in the first fixed electrode 16a and the second movable electrode 13b. An electret having positive charge or negative charge may be provided in the second fixed electrode 16b and the first movable electrode 13a.

Also in the present modification, the first pair of the first fixed electrode 16a and the first movable electrode 13a, and the second pair of the second fixed electrode 16b and the second movable electrode 13b are in the state where the first pair and the second pair are connected in parallel. The energy harvesting device 1 can generate power by the two electrode pairs that are electrically connected in parallel, and the voltage supplied to the outside of the energy harvesting device 1 can be reduced. Therefore, the output impedance can be reduced, and it is possible to prevent that the selection of components to be connected to the vibration-driven energy harvesting element 10 become difficult.

Although various embodiments and modifications have been described in the above, the present invention is not limited to these contents. The other aspects that can be considered within the scope of the technical idea of the present invention are also included in the scope of the present invention.

REFERENCE SIGNS LIST 1 energy harvesting device
10 energy harvesting element
12 movable part
13a first movable electrode
13b second movable electrode
15 insulating part
16a first fixed electrode
16b second fixed electrode
20 converter
21a first rectifier
21b second rectifier
25 first output part
26 second output part
30 power storage part
40 transformer

The invention claimed is:

1. An energy harvesting element that generates power by vibration, the energy harvesting element comprising:
a first electrode and a second electrode;
a member having a third electrode electrically connected to the second electrode, and facing the first electrode, and a fourth electrode relatively fixed to the third electrode without being electrically connected to the third electrode, and electrically connected to the first electrode and facing the second electrode, the member being provided between the first electrode and the second electrode; and
an electret provided in one of the first electrode and the third electrode, and one of the second electrode and the fourth electrode.

2. The energy harvesting element according to claim 1, wherein the fourth electrode is fixed to the third electrode via an insulating part.

3. The energy harvesting element according to claim 1, wherein the member is a movable part that is movable with respect to the first electrode and the second electrode.

4. The energy harvesting element according to claim 3, wherein the movable part is vibrated between the first electrode and the second electrode when vibration is given from an outside, and
when the movable part is vibrated, power is generated by the first electrode and the third electrode, and power is generated by the second electrode and the fourth electrode.

5. An energy harvesting device, comprising:
the energy harvesting element according to claim 1; and
a rectifier having an electrode electrically connected to the first electrode and the fourth electrode, and an electrode electrically connected to the second electrode and the third electrode.

6. The energy harvesting device according to claim 5, wherein the rectifier rectifies alternating current generated by the first electrode and the third electrode, and the second electrode and the fourth electrode.

7. The energy harvesting device according to claim 6, wherein the rectifier is a diode.

8. An energy harvesting element that generates power by vibration, the energy harvesting element comprising:
a first electrode and a second electrode electrically connected to the first electrode;
a member having a third electrode facing the first electrode, and a fourth electrode relatively fixed to the third electrode, and electrically connected to the third electrode and facing the second electrode, the member being provided between the first electrode and the second electrode; and
an electret provided in one of the first electrode and the third electrode, and one of the second electrode and the fourth electrode
wherein the first electrode and the second electrode are both electrically connected to an external circuit via the same wire.

9. An energy harvesting device, comprising:
the energy harvesting element according to claim 8; and
a rectifier having an electrode electrically connected to the first electrode and the second electrode, and an electrode electrically connected to the third electrode and the fourth electrode.

* * * * *